US011382484B2

(12) United States Patent
Fryman et al.

(10) Patent No.: US 11,382,484 B2
(45) Date of Patent: Jul. 12, 2022

(54) DISHWASHING APPLIANCE AND ELECTRIC MOTOR FOR A FLUID PUMP WITH A THERMAL-PROTECTION ASSEMBLY

(71) Applicant: Haier US Appliance Solutions, Inc., Wilmington, DE (US)

(72) Inventors: Mark Thomas Fryman, Louisville, KY (US); John Edward Dries, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 356 days.

(21) Appl. No.: 16/750,241

(22) Filed: Jan. 23, 2020

(65) Prior Publication Data

US 2021/0228058 A1 Jul. 29, 2021

(51) Int. Cl.
| | |
|---|---|
| *A47L 15/42* | (2006.01) |
| *F04B 17/03* | (2006.01) |
| *H02K 7/14* | (2006.01) |
| *F04D 13/14* | (2006.01) |
| *F04D 29/44* | (2006.01) |
| *H02K 3/32* | (2006.01) |
| *F04D 29/42* | (2006.01) |
| *H02K 1/14* | (2006.01) |
| *H02K 5/22* | (2006.01) |
| *A47L 15/22* | (2006.01) |

(52) U.S. Cl.
CPC .......... *A47L 15/4225* (2013.01); *F04B 17/03* (2013.01); *F04D 13/14* (2013.01); *F04D 29/4293* (2013.01); *F04D 29/448* (2013.01); *H02K 1/146* (2013.01); *H02K 3/325* (2013.01); *H02K 5/225* (2013.01); *H02K 7/14* (2013.01); *A47L 15/22* (2013.01); *F05D 2260/602* (2013.01)

(58) Field of Classification Search
CPC .......... F04B 17/03; H02K 7/14; H02K 3/325; H02K 5/225; H02K 1/146; A47L 15/4225; A47L 15/22; F04D 13/14; F04D 29/4293; F04D 29/448; F05D 2260/602
See application file for complete search history.

(56) References Cited

U.S. PATENT DOCUMENTS

| 6,005,471 A | 12/1999 | Higashikata et al. |
| 6,639,502 B2 | 10/2003 | Herrick |

(Continued)

FOREIGN PATENT DOCUMENTS

| CN | 103503302 A | 1/2014 |
| CN | 104854349 B | 8/2015 |

(Continued)

*Primary Examiner* — Benjamin L Osterhout
(74) *Attorney, Agent, or Firm* — Dority & Manning, P.A.

(57) ABSTRACT

A dishwashing appliance or fluid pump, as provided herein may include a fluid impeller, an electric motor, and a housing. The fluid impeller may be rotatably receivable within a tub of the dishwashing appliance. The electric motor may be in mechanical communication with the fluid impeller to motivate rotation thereof. The electric motor may include a multi-phase winding set sealed within an overmolded insulation. The housing may enclose the electric motor therein. The housing may be receivable within a sump to which water is directed in the dishwashing appliance.

18 Claims, 15 Drawing Sheets

(56) References Cited

U.S. PATENT DOCUMENTS

| | | | |
|---|---|---|---|
| 7,535,136 B2 | 5/2009 | Rush et al. | |
| 8,076,813 B2 | 12/2011 | Hussey et al. | |
| 9,596,974 B1* | 3/2017 | Dries | A47L 15/22 |
| 10,349,810 B2 | 7/2019 | Dries et al. | |
| 2016/0097392 A1* | 4/2016 | Xu | F04D 13/0693 |
| | | | 134/195 |
| 2016/0198926 A1* | 7/2016 | Dries | A47L 15/4202 |
| | | | 134/111 |
| 2016/0327048 A1* | 11/2016 | Xu | A47L 15/4225 |
| 2017/0079503 A1* | 3/2017 | Dries | A47L 15/4208 |
| 2017/0143180 A1* | 5/2017 | Dries | A47L 15/4221 |
| 2018/0263458 A1* | 9/2018 | Dries | A47L 15/4208 |
| 2018/0279850 A1* | 10/2018 | Dries | A47L 15/4221 |
| 2018/0325348 A1* | 11/2018 | Dries | A47L 15/42 |
| 2019/0046000 A1* | 2/2019 | Dries | A47L 15/4225 |
| 2019/0046001 A1* | 2/2019 | Dries | F04D 29/628 |
| 2020/0253455 A1* | 8/2020 | Dries | A47L 15/4297 |

FOREIGN PATENT DOCUMENTS

| | | |
|---|---|---|
| KR | 100727584 B1 | 6/2007 |
| WO | WO2012053347 A1 | 4/2012 |

\* cited by examiner

DISHWASHING APPLIANCE AND ELECTRIC MOTOR FOR A FLUID PUMP WITH A THERMAL-PROTECTION ASSEMBLY

FIELD OF THE INVENTION

The present subject matter relates generally to dishwashing appliances and more particularly to dishwashing appliances having electric motors with one or more for features for thermal protection.

BACKGROUND OF THE INVENTION

Dishwashers or dishwashing appliances generally include a tub that defines a wash chamber for receipt of articles for washing. A door provides or permits selective access to the wash chamber. During wash and rinse cycles, dishwashing appliances generally circulate a fluid through a wash chamber over articles, such as pots, pans, silverware, etc. The fluid can be, for example, various combinations of water and detergent during the wash cycle or water (which may include additives) during the rinse cycle. After the rinse cycle is complete, a drain cycle can be performed to remove the fluid from the wash chamber. Typically, one or more pumps are provided to motivate the fluid through or from the wash chamber. For example, the fluid within a dishwashing appliance is typically circulated during a given cycle using a circulation pump. Fluid is collected in a sump at or near a bottom of the wash chamber and pumped back into the wash chamber through, for example, nozzles in spray arms and other openings that direct the fluid against the articles to be cleaned or rinsed. After the rinse cycle is complete, the drain pump may be activated to pump fluid out of the wash chamber.

Often, circulation and drain pumps are mounted directly to the tub defining a wash chamber. A water tight seal is generally required between a pump and the tub. This need to a water tight seal can lead to further issues. For instance, great care must be taken when connecting a circulation or drain pump (e.g., an electric motor thereof) to a power source since any opening formed through the pump may risk introducing a leak point wherein moisture may be introduced to an undesired location of the pump, such as an electric motor. This may be especially true if the electric motor is mounted within an often liquid-filled portion of the dishwashing appliance.

Separate from or in addition to issues regarding the prevention of moisture to an electric motor, issues may arise concerning heat management. For instance, features may be needed to prevent the electric motor from inadvertently overheating. Attempts have been made to provide thermal switches on or near an electric motor within a dishwashing appliance. Existing attempts generally require complex wiring and often require additional openings through the pump, which may create more potential leak points. In turn, such existing attempts are often unreliable or otherwise unsatisfactory.

As a result, it would be useful to provide a dishwashing appliance addressing one or more of the above identified issues. In particular, it may be advantageous to provide a dishwashing appliance that includes features for providing thermal protection without creating additional opening or potential leak points.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a fluid pump for a dishwashing appliance is provided. The fluid pump may include a fluid impeller, an electric motor, and a housing. The fluid impeller may be rotatably receivable within a tub of the dishwashing appliance. The electric motor may be in mechanical communication with the fluid impeller to motivate rotation thereof. The electric motor may include a multi-phase winding set sealed within an overmolded insulation. The housing may enclose the electric motor therein. The housing may be receivable within a sump to which water is directed in the dishwashing appliance.

In another exemplary aspect of the present disclosure, a dishwashing appliance is provided. The dishwashing appliance may include a tub, a sump, and a fluid pump. The tub may define a wash chamber. The sump may be positioned at a bottom portion of the tub along a vertical direction. The sump may include a bottom wall defining a recessed chamber. The fluid pump may be in fluid communication with the sump to motivate a fluid therefrom. The fluid pump may include a fluid impeller, an electric motor, and housing. The fluid impeller may be rotatably positioned within the tub. The electric motor may be in mechanical communication with the fluid impeller to motivate rotation thereof. The electric motor may include a multi-phase winding set sealed within an overmolded insulation. The housing may enclose the electric motor therein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
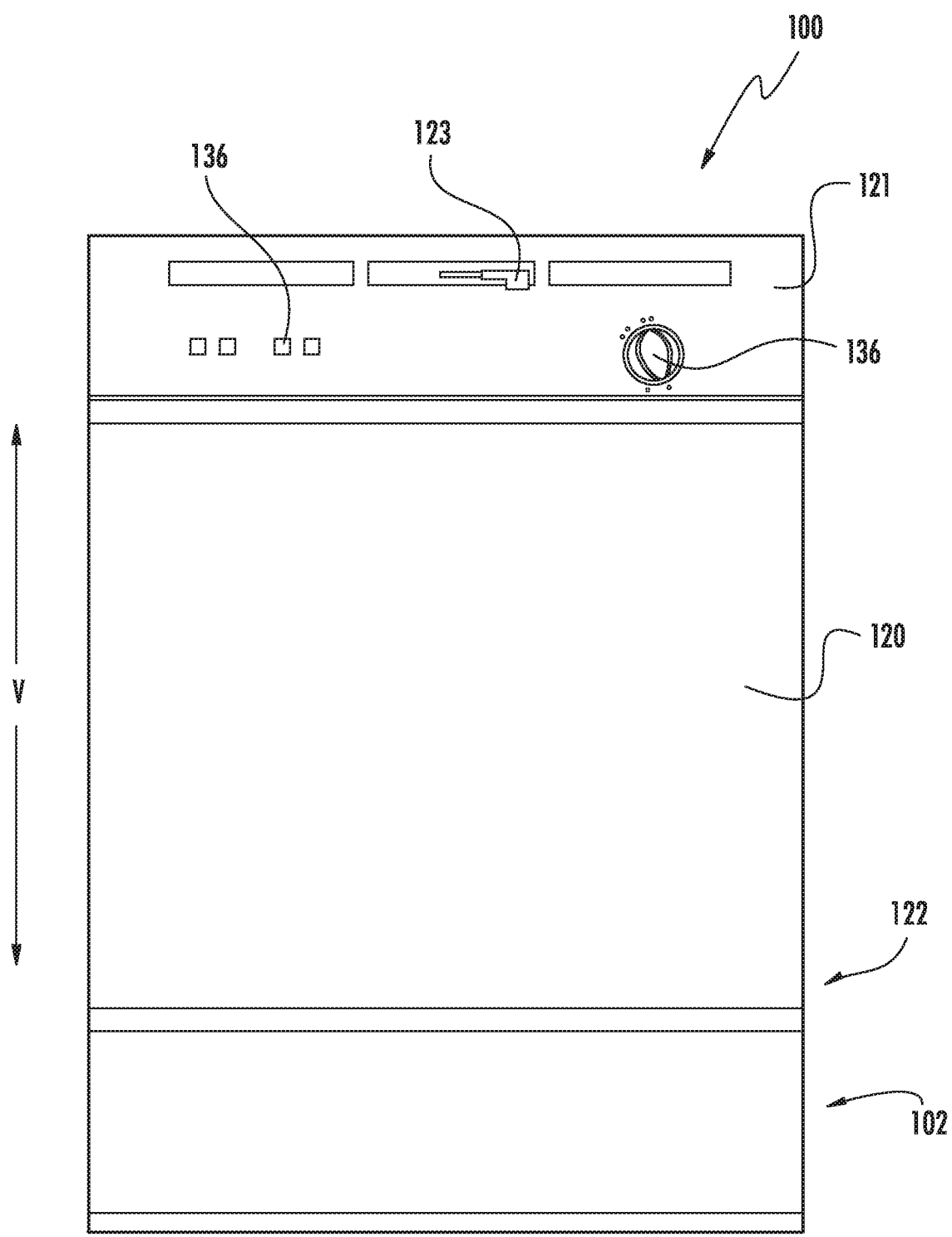
FIG. 1 provides a front perspective view of a dishwashing appliance according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Figure 2:
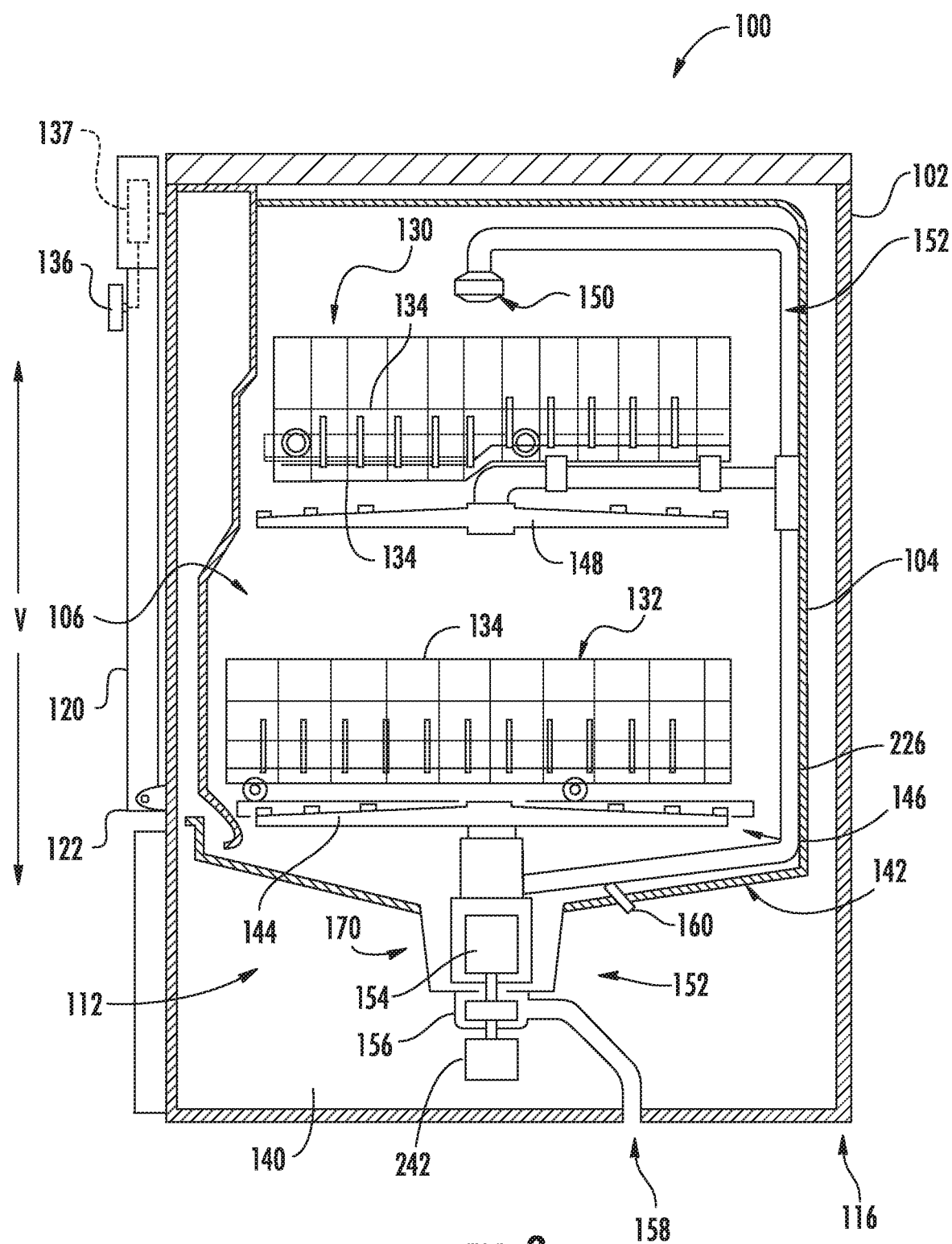
FIG. 2 provides a side, cross-sectional view of the exemplary dishwashing appliance of FIG. 1.
Figure 3:
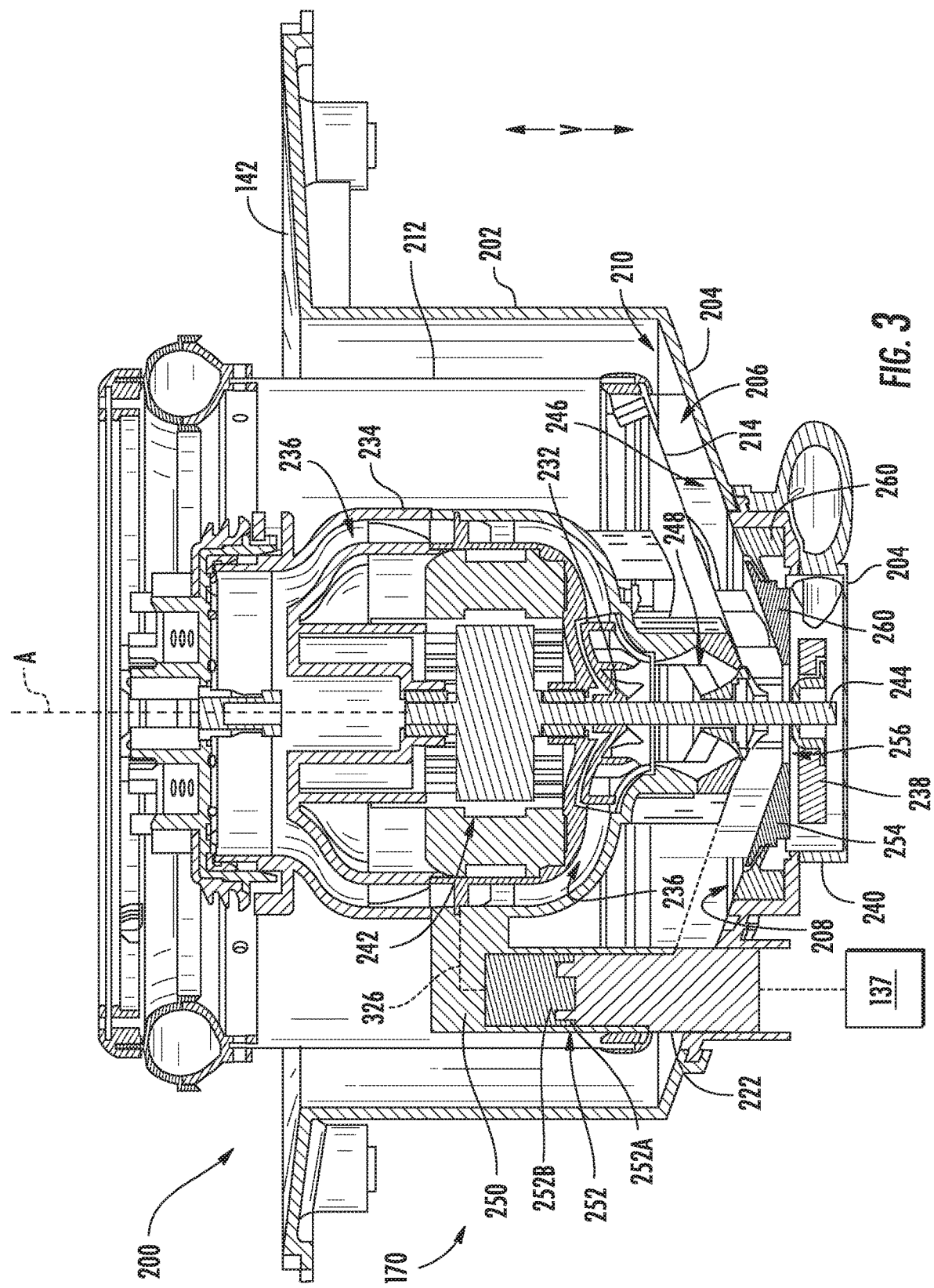
FIG. 3 provides a cross-sectional view of a sump of the exemplary dishwashing appliance of FIG. 1.

FIGS. 1 and 2 depict a dishwashing appliance 100 according to an exemplary embodiment of the present disclosure. As shown in FIG. 1, dishwashing appliance 100 includes a cabinet 102. Cabinet 102 has a tub 104 therein that defines a wash compartment 106. The tub 104 also defines a front opening (not shown). Dishwashing appliance 100 includes a door 120 hinged at a bottom 122 of door 120 for movement between a normally closed, vertical position (shown in FIGS. 1 and 2), wherein wash compartment 106 is sealed shut for washing operation, and a horizontal, open position for loading and unloading of articles from dishwashing appliance 100. In some embodiments, a latch 123 is used to lock and unlock door 120 for access to wash compartment 106. Tub 104 also includes a sump 170 positioned adjacent a bottom portion 112 of tub 104 and configured for receipt of a liquid wash fluid (e.g., water, detergent, wash fluid, or any other suitable fluid) during operation of dishwashing appliance 100.

In certain embodiments, a spout 160 is positioned adjacent sump 170 of dishwashing appliance 100. Spout 160 is configured for directing liquid into sump 170. Spout 160 may receive liquid from, for example, a water supply (not shown) or any other suitable source. In alternative embodiments, spout 160 may be positioned at any suitable location within dishwashing appliance 100 (e.g., such that spout 160 directs liquid into tub 104). Spout 160 may include a valve (not shown) such that liquid may be selectively directed into tub 104. Thus, for example, during the cycles described below, spout 160 may selectively direct water or wash fluid into sump 170 as required by the current cycle of dishwashing appliance 100.

Rack assemblies 130 and 132 may be slidably mounted within wash compartment 106. In some embodiments, each of the rack assemblies 130 and 132 is fabricated into lattice structures including a plurality of elongated members 134. Each rack of the rack assemblies 130 and 132 is generally adapted for movement between an extended loading position (not shown) in which the rack is substantially positioned outside the wash compartment 106, and a retracted position (shown in FIGS. 1 and 2) in which the rack is located inside the wash compartment 106. A silverware basket (not shown) may be removably attached to rack assembly 132 for placement of silverware, utensils, and the like, that are otherwise too small to be accommodated by the racks 130 and 132.

In certain embodiments, dishwashing appliance 100 includes a lower spray assembly 144 that is rotatably mounted within a lower region 146 of the wash compartment 106 and above sump 170 so as to rotate in relatively close proximity to rack assembly 132. Optionally, a mid-level spray assembly 148 is located in an upper region of the wash compartment 106 and may be located in close proximity to upper rack 130. Additionally or alternatively, an upper spray assembly 150 may be located above the upper rack 130.

In exemplary embodiments, lower and mid-level spray assemblies 144 and 148 and the upper spray assembly 150 are fed by a fluid circulation assembly 152 for circulating water and dishwasher fluid in the tub 104. Fluid circulation assembly 152 includes one or more fluid pumps (e.g., a circulation pump 154 or a cross-flow/drain pump 156). As will be discussed in greater detail below, some embodiments include circulation pump 154 positioned at least partially within sump 170 and drain pump positioned below circulation pump 154 in fluid communication with sump 170. Additionally, drain pump 156 may be configured for urging the flow of wash fluid from sump 170 to a drain 158 when activated. By contrast, circulation pump 154 may be configured for supplying a flow of wash fluid from sump 170 to spray assemblies 144, 148 and 150 by way of one or more circulation conduits 226 when activated. Moreover, a filter assembly may be also positioned at least partially in sump 170 for filtering food particles or other debris, referred to herein generally as soils, from wash fluid prior to such wash fluid flowing to circulation pump 154.

Spray assemblies 144 and 148 include an arrangement of discharge nozzles or orifices for directing wash fluid onto dishes or other articles located in rack assemblies 130 and 132. The arrangement of the discharge nozzles in spray assemblies 144 and 148 provides a rotational force by virtue of wash fluid flowing through the discharge ports. The resultant rotation of the spray assemblies 144 and 148 provides coverage of dishes and other dishwasher contents with a spray of wash fluid.

Dishwashing appliance 100 is further equipped with a controller 137 to regulate operation of the dishwashing appliance 100. Controller 137 may include a memory (e.g., non-transitive media) and microprocessor, such as a general or special purpose microprocessor operable to execute programming instructions or micro-control code associated with a washing operation. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 137 may be constructed without using a microprocessor (e.g., using a combination of discrete analog or digital logic circuitry, such as switches, amplifiers, integrators, comparators, flip-flops, AND gates, and the like) to perform control functionality instead of relying upon software.

Controller 137 may be positioned in a variety of locations throughout dishwashing appliance 100. In the illustrated embodiment, controller 137 may be located within a control panel area 121 of door 120 as shown. In such an embodiment, input/output ("I/O") signals may be routed between controller 137 and various operational components of dishwashing appliance 100 along wiring harnesses that may be routed through the bottom 122 of door 120. Typically, controller 137 includes a user interface panel 136 through which a user may select various operational features and modes and monitor progress of the dishwashing appliance 100. In one embodiment, user interface 136 may represent a general purpose I/O ("GPIO") device or functional block. In one embodiment, user interface 136 may include input components, such as one or more of a variety of electrical, mechanical or electro-mechanical input devices including rotary dials, push buttons, and touch pads. User interface 136 may include a display component, such as a digital or analog display device designed to provide operational feedback to a user. User interface 136 may be in communication (e.g., electrical or wired communication) with controller 137 via one or more signal lines or shared communication busses.

It should be appreciated that the subject matter disclosed herein is not limited to any particular style, model or configuration of dishwashing appliance, and that the embodiment depicted in the figures is for illustrative purposes only. For example, instead of the racks 130 and 132 depicted in FIG. 1, dishwashing appliance 100 may be of a known configuration that utilizes drawers that pull out from the cabinet and are accessible from the top for loading and unloading of articles.

Figure 4:
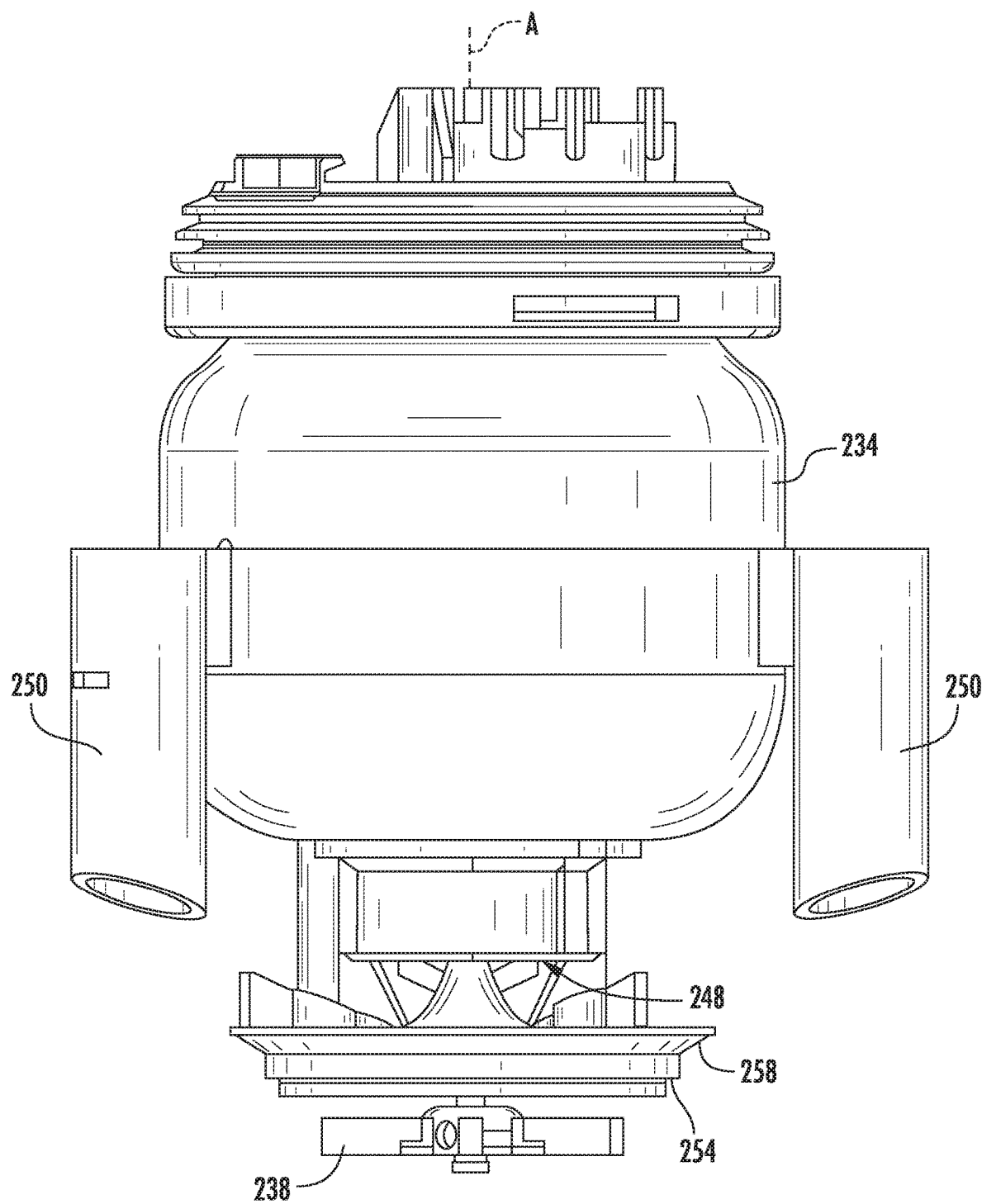
FIG. 4 provides a side perspective view of a pump assembly of the exemplary dishwashing appliance of FIG. 1.
Figure 5:
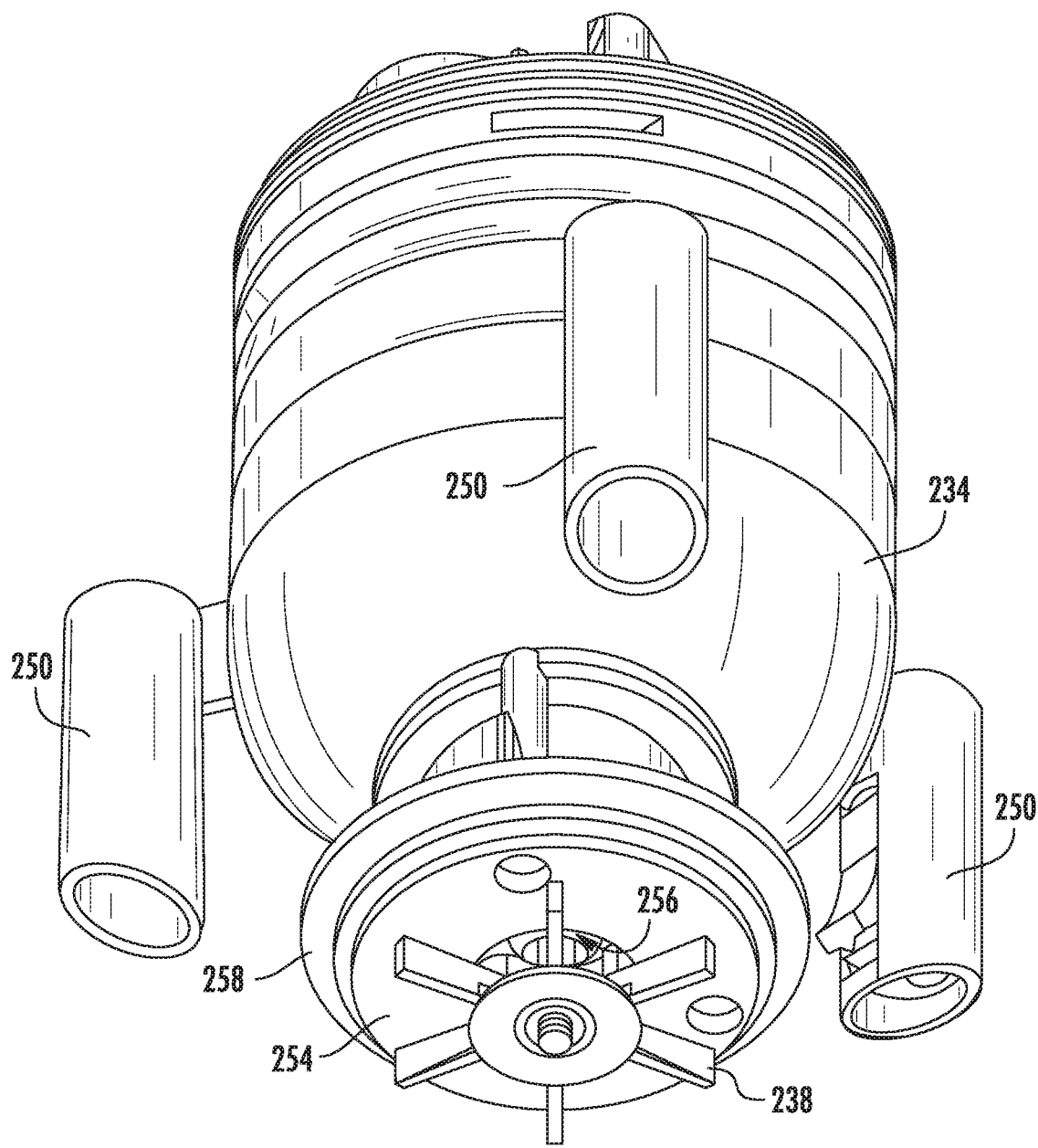
FIG. 5 provides a bottom perspective view of the exemplary pump assembly of FIG. 4.
Figure 6:
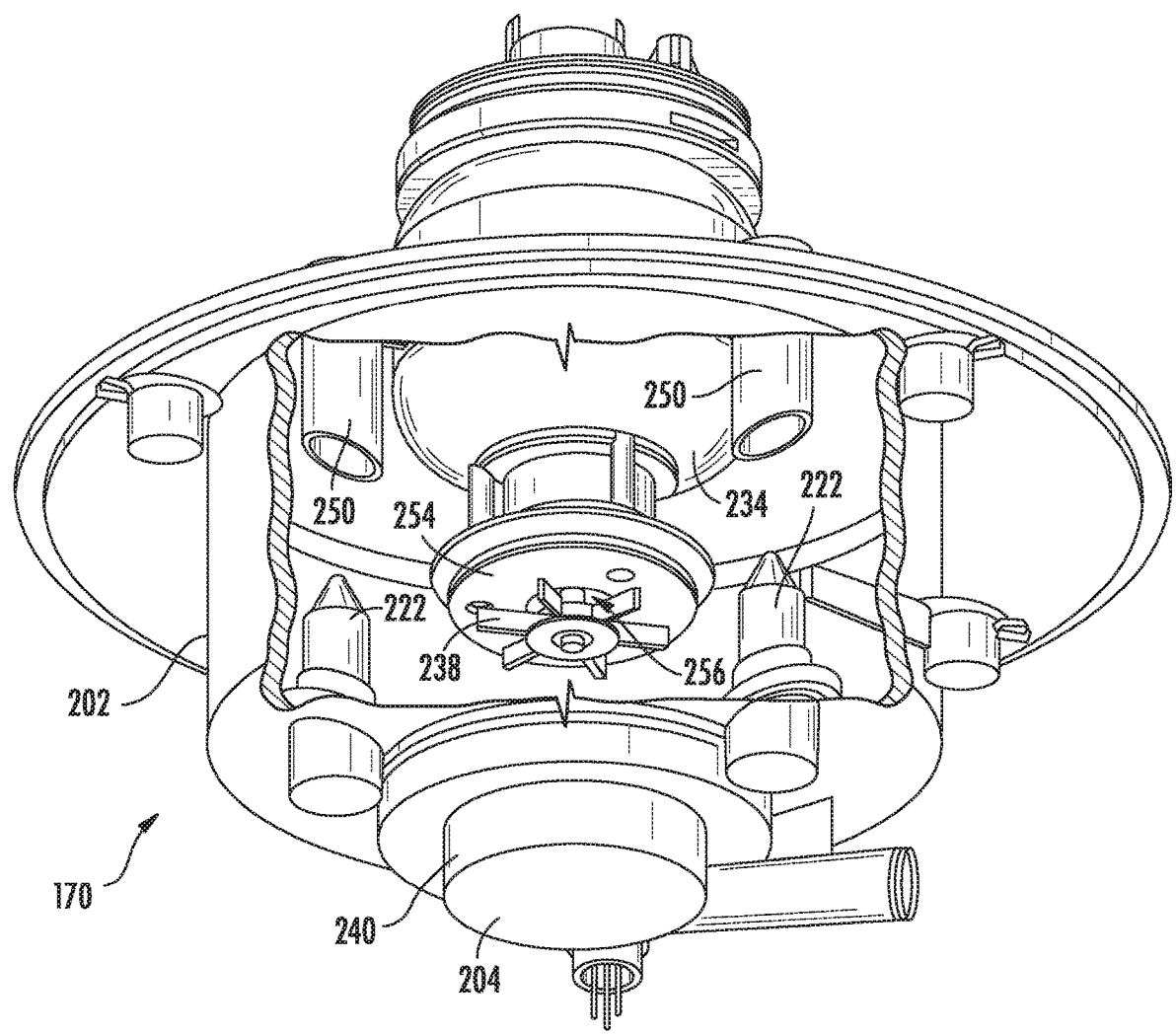
FIG. 6 provides a bottom perspective view of the exemplary sump of FIG. 3, with the pump partially removed therefrom and a bottom portion of the sump removed for the sake of clarity.
Figure 16:
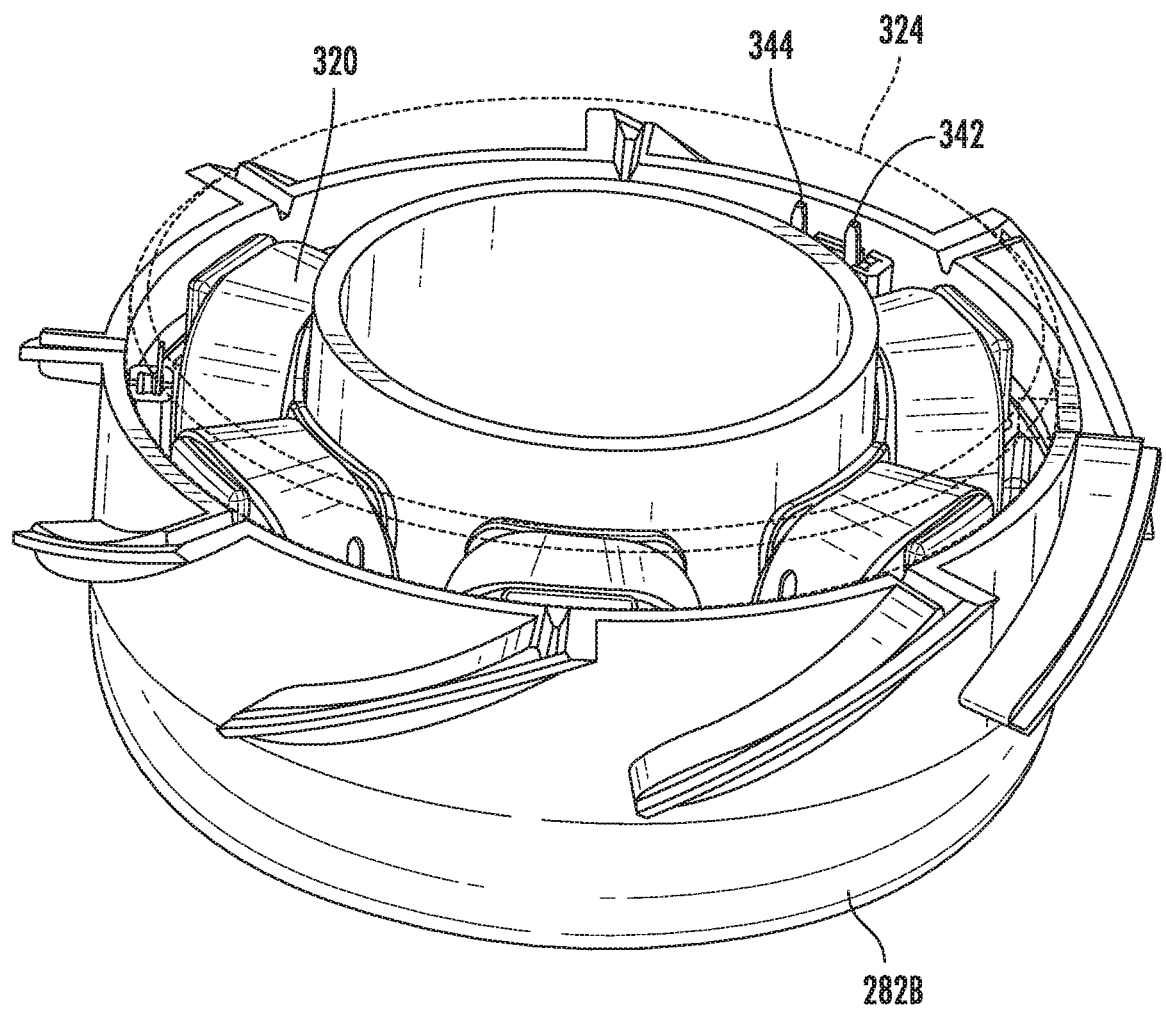
FIG. 16 provides a perspective view of a portion of the exemplary pump assembly of FIG. 4, including the electric motor thereof.
Figure 17:
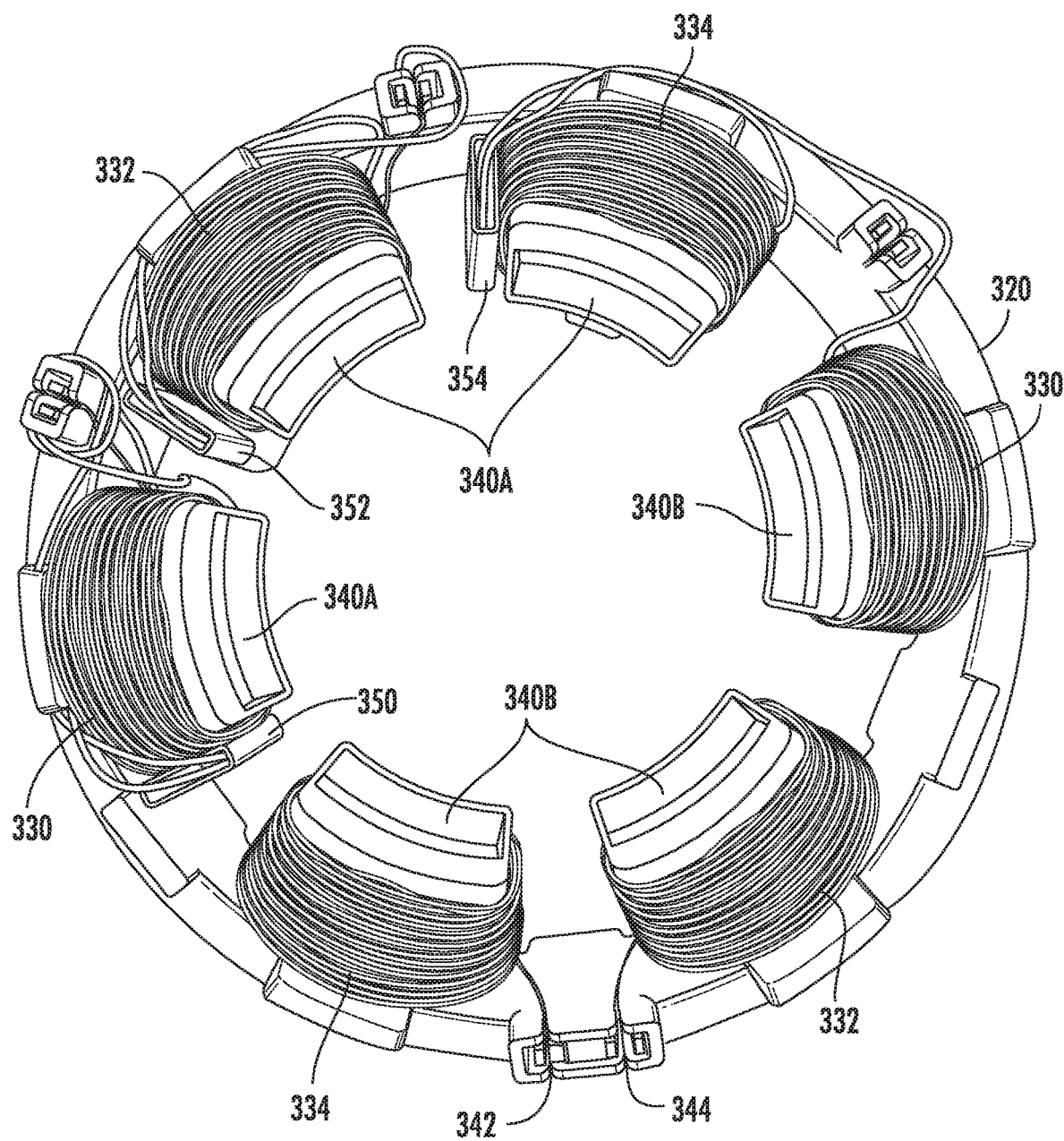
FIG. 17 provides a perspective view of a portion of the electric motor of the exemplary pump assembly of FIG. 4.

Turning now to FIGS. 3 through 15, FIGS. 3 and 6 through 8 provide various views of the sump 170, including a pump assembly 200 and housing 234 therefor. FIGS. 4 and 5 provide various views of portions of the pump assembly 200 in isolation from sump 170. FIGS. 9 through 15 provide various views of portions of the pump assembly 200, including a chamber pump housing 234. FIGS. 16 and 17 provide various views of further portions of the pump assembly 200, including an electric motor 242 thereof.

As noted above, sump 170 is positioned at a bottom portion 112 of tub 104 (FIG. 2) along the vertical direction V. Sump 170 defines an axial direction A that may be, for example, parallel to the vertical direction V. Optionally, sump 170 is formed integrally with a bottom wall 142 of tub 104. However, in other embodiments, sump 170 may instead be formed separately from bottom wall 142 of tub 104 and attached to bottom wall 142 of tub 104 in any suitable manner. Additionally, sump 170 may have any other suitable orientation.

As shown, sump 170 includes a side wall 202 and a bottom wall 204. Sidewall 202 may define a substantially cylindrical shape along the axial direction A, although in other embodiments, sidewall 202 may instead define any other suitable shape, such as a frustoconical shape, or alternatively an inverted frustoconical shape along the axial direction A.

In exemplary embodiments, bottom wall 204 extends radially inward from sidewall 202 and defines a recessed chamber 206 bounded by walls 202, 204. Recessed chamber 206 is defined at its perimeter by a rim portion of bottom wall 204 extending downward generally downward (e.g., toward the axial direction A or parallel thereto). Recessed chamber 206 also defines an opening 210 having, for example, a generally circular shape. Moreover, bottom wall 204 defines a drain opening 208 in a portion that opens into the recessed chamber 206.

In some embodiments, a filter assembly is positioned at least partially within sump 170 along the axial direction A (e.g., with or as a portion of pump assembly 200). The filter assembly may include multiple panels, such as a side panel 212, a bottom panel 214, or a top panel (not pictured). One or more of side panel 212, bottom panel 214, and top panel may include a filter medium defining a plurality of openings or pores configured to allow wash fluid to pass therethrough while preventing soils, such as food particles or other debris, larger than a predetermined size to pass therethrough. For example, in certain embodiments, one or more of side panel 212, bottom panel 214, and the top panel may include a fine mesh material.

In exemplary embodiments, a circulation pump 154 is included within pump assembly 200. More particularly, circulation pump 154 includes a fluid impeller (e.g., circulation impeller 232) and a chamber pump housing 234. When assembled, circulation impeller 232 is positioned within pump assembly 200 and is enclosed by chamber pump housing 234. In some embodiments, circulation pump 154, including chamber pump housing 234, is held in position along the axial direction A by one or more elastomer columns 222. In certain embodiments, pump housing 234 defines a plurality of guide veins 236 that are downstream of impeller 232 and in fluid communication with circulation conduit 226 (FIG. 2). Guide veins 236 may thus direct a flow F of wash fluid from circulation impeller 232 to the circulation conduit 226 (e.g., during a circulation cycle). In exemplary embodiments, circulation pump 154 is positioned at least partially within the filter assembly (e.g., within one or more of the panels thereof).

As will be further described below, in optional embodiments, pump housing 234 defines a plurality of internal channels 236 that are downstream of impeller 232 and in fluid communication with circulation conduit 226 (FIG. 2). Thus, internal channels 236 are in fluid communication with one or more of the spray assemblies 142, 148, 150). Internal channels 236 may direct a flow F of wash fluid from circulation impeller 232 to the circulation conduit 226 (e.g., during a circulation cycle). One or more diffuser vanes 270 extend (e.g., radially) within chamber pump housing 234 to convert a velocity head of flow F to a static head within internal channels 236. In exemplary embodiments, circulation pump 154 is positioned at least partially within the filter assembly (e.g., within one or more of the panels thereof).

As illustrated, some embodiments include an electric motor 242 mounted within a portion of the sump 170. For instance, the electric motor 242 may be enclosed within a portion of chamber pump housing 234 radially inward from the vane(s) 270. In particular, a multi-phase winding set 320 of the electric motor 242 may be sealed within an inner cavity 322 defined by the chamber pump housing 234 (e.g., as a generally-toroidal chamber within an inner diffuser bowl 282). Within inner cavity 322, an overmolded insulation 324 may cover the multi-phase winding set 320 inside inner cavity 322, potting electric motor 242 such that multi-phase winding set 320 is sealed within the surrounding overmolded insulation 324. Generally, the overmolded insulation 324 may be any suitable material (e.g., flowed to and hardened within inner cavity 322), such as an unsaturated polyester. Advantageously, the overmolded insulation 324 may hermetically seal and electrically insulate multi-phase winding set 320, preventing multi-phase winding set 320 from being damaged if a portion of the chamber pump housing 234 ruptures to permit water or wash fluid to inner cavity 322.

In some embodiments, the one or more elastomer columns 222 may generally vertically or otherwise parallel to the axial direction A between chamber pump housing 234 and the bottom wall 204 of sump 170. More particularly, for the embodiment depicted, the one or more elastomer columns 222 extend from chamber pump housing 234 through recessed chamber 206 to bottom wall 204 of sump 170. As shown, chamber pump housing 234 may be held or supported on the elastomer columns 222. For instance, chamber pump housing 234 may include one or more support tubes 250 circumferentially positioned about chamber pump housing 234 (e.g., radially outward relative to guide veins 236). Each support tube 250 may generally correspond to and selectively receive one of the elastomer columns 222. When received within the support tubes 250, elastomer columns 222 may provide supportive engagement with the chamber pump housing 234. In particular, substantially all of the mass or weight of chamber pump housing 234 may be directed to, or otherwise borne, by elastomer columns 222.

Generally, a power line 326 extends through the chamber pump housing 234 to the electric motor 242. Specifically, power line 326, including one or more intermediate conductive wires or buses, extends in conductive or electrical communication with a power source (e.g., residential or commercial power grid) outside of dishwashing appliance 100. When assembled, power line 326 may thus extend from an outer portion of dishwashing appliance 100 (e.g., at the power source), through chamber pump housing 234, and to electric motor 242 to connect the power source to the electric motor 242. For instance, the power line 326 may be a singular, sole electrical connection cord (e.g., including two or more lines for establishing or otherwise together providing an electrical circuit with electric motor 242) passing from an outer portion of chamber pump housing 234 to the electric motor 242. Advantageously, there may be no further electrical connections extending to electric motor 242, which might otherwise create potential leak points into which water or wash fluid may flow, thereby damaging electric motor 242.

In optional embodiments, power line 326 extends through at least one elastomer column. As shown, the at least one elastomer column 222 and corresponding support tube 250 may form a mated electrical plug-socket 252 along power line 326. For instance, at least one elastomer column 222 may include an electrical male plug 252A, while corresponding support tube 250 includes an electrical female socket 252B. Alternatively, the electrical male plug 252A may be provided within the support tube 250 while the female socket 252B is provided on or within the elastomer column 222. Thus, the elastomer column 222 may be in conductive or electrical communication with the power source (e.g., through one or more intermediate conductive wires or buses). The support tube 250 may be in conductive or electrical communication with the electric motor 242. When assembled, the mated electrical plug-socket 252 may connect the power source to the electric motor 242. An electrical connection may thus be formed with the electric motor 242 through at least one elastomer column 222.

In some embodiments, pump assembly 200 includes a drain pump 156, which itself includes a fluid impeller (e.g., drain impeller 238) and a drain pump housing 240. When assembled, drain impeller 238 may be enclosed by drain pump housing 240, and drain pump housing 240 is attached to or otherwise formed by sump 170. More particularly, drain pump housing 240 is positioned below and in fluid communication with the recessed chamber 206 defined by bottom wall 204 of sump 170 assembly through a drain opening 208 of bottom wall 204 of sump 170. In certain exemplary embodiments, drain pump housing 240 may be formed integrally with sump 170, or alternatively may be attached to sump 170 in any suitable manner.

As shown, a volute cover 254 may be positioned over or across at least a portion of drain opening 208. In some embodiments, volute cover 254 is mounted to chamber pump housing 234 (e.g., via one or more adhesives, mechanical fasteners, or integral unitary members). When assembled, volute cover 254 may thus be positioned between electric motor 242 and drain impeller 238 (e.g., along the axial direction A). A cover opening or inlet 256 is defined through volute cover 254 (e.g., along the axial direction A or a direction that is parallel or otherwise nonorthogonal to the vertical direction V). Fluid communication and a flow F between recessed chamber 206 and drain pump housing 240 may thus be permitted through the cover inlet 256.

In some embodiments, volute cover 254 includes a radial flange 258 (e.g., along a radial or outer perimeter of volute cover 254). For instance, radial flange 258 may be disposed about the axial direction A at a radial outermost portion of volute cover 254. When assembled, radial flange 258 may be positioned, at least in part, above an elastomer seal 260 that extends about or around drain opening 208.

As shown, an elastomer seal 260 may be mounted on sump 170 (e.g., on bottom wall 204) at a position that is generally higher than drain impeller 238 relative to the vertical direction V or axial direction A. Elastomer seal 260 may further be positioned, at least in part, between radial flange 258 and recessed chamber 206 (or between radial flange 258 and drain impeller 238) along the axial direction A. In some embodiments, elastomer seal 260 includes a ring support body and an interface surface extending therefrom. For instance, interface surface may extend radially inward from ring support body toward the axial direction A.

In some embodiments, pump assembly 200 includes an axial shaft 244 engaged (e.g., in mechanical communication) with electric motor 242. During operations, axial shaft 244 may thus be rotated by electric motor 242. As shown, electric motor 242 may be positioned above drain impeller 238 or circulation impeller 232 (e.g., along the vertical direction V or axial direction A). Moreover, circulation impeller 232 may be positioned above volute cover 254. In exemplary embodiments, axial shaft 244 extends through circulation impeller 232, through volute cover 254 (e.g., at cover inlet 256), and into drain impeller 238 along the axial direction A. Axial shaft 244 may be selectively engaged (e.g., in mechanical communication) with drain impeller 238 and circulation impeller 232, such that rotation of axial shaft 244 rotates drain impeller 238 or rotates circulation impeller 232.

In optional embodiments, circulation pump 154 may include a one-way clutch (not shown) in mechanical communication with circulation impeller 232 and axial shaft 244. When axial shaft 244 is rotated in a first direction by electric motor 242, the one-way clutch of circulation impeller 232 is configured to engage circulation impeller 232 and rotate circulation impeller 232. Alternatively, circulation impeller 232 may be fixed to axial shaft 244 (e.g., such that rotation of axial shaft 242 in either a first or second direction rotates circulation impeller 232).

In additional or alternative embodiments, drain pump 156 further includes a one-way clutch 268 in mechanical communication with drain impeller 238 and axial shaft 244. When axial shaft 244 is rotated in a second direction by electric motor 242, the second direction being an opposite direction of the first direction, the one-way clutch 268 of the drain impeller 238 is configured to engage drain impeller 238 and rotate drain impeller 238. In some such embodiments, only one of circulation pump 154 and drain pump 156 may be activated at a given time. Alternatively, drain impeller 238 may be fixed to axial shaft 244 (e.g., such that rotation of axial shaft 242 in either a first or second direction rotates drain impeller 238).

Advantageously, the present the filter assembly, including electric motor 242 and impellers 232, 238 may be assembled by lowering chamber pump housing 234 into sump 170, without requiring a separate electric motor in an area below recessed chamber 206, or without requiring access to the same. Additionally or alternatively, most, if not all, of the pump assembly 200 (e.g., electric motor 242, chamber pump housing 234, volute cover 254, and impellers 232, 238) may be preassembled prior to being mounted within sump 170.

Figure 7:
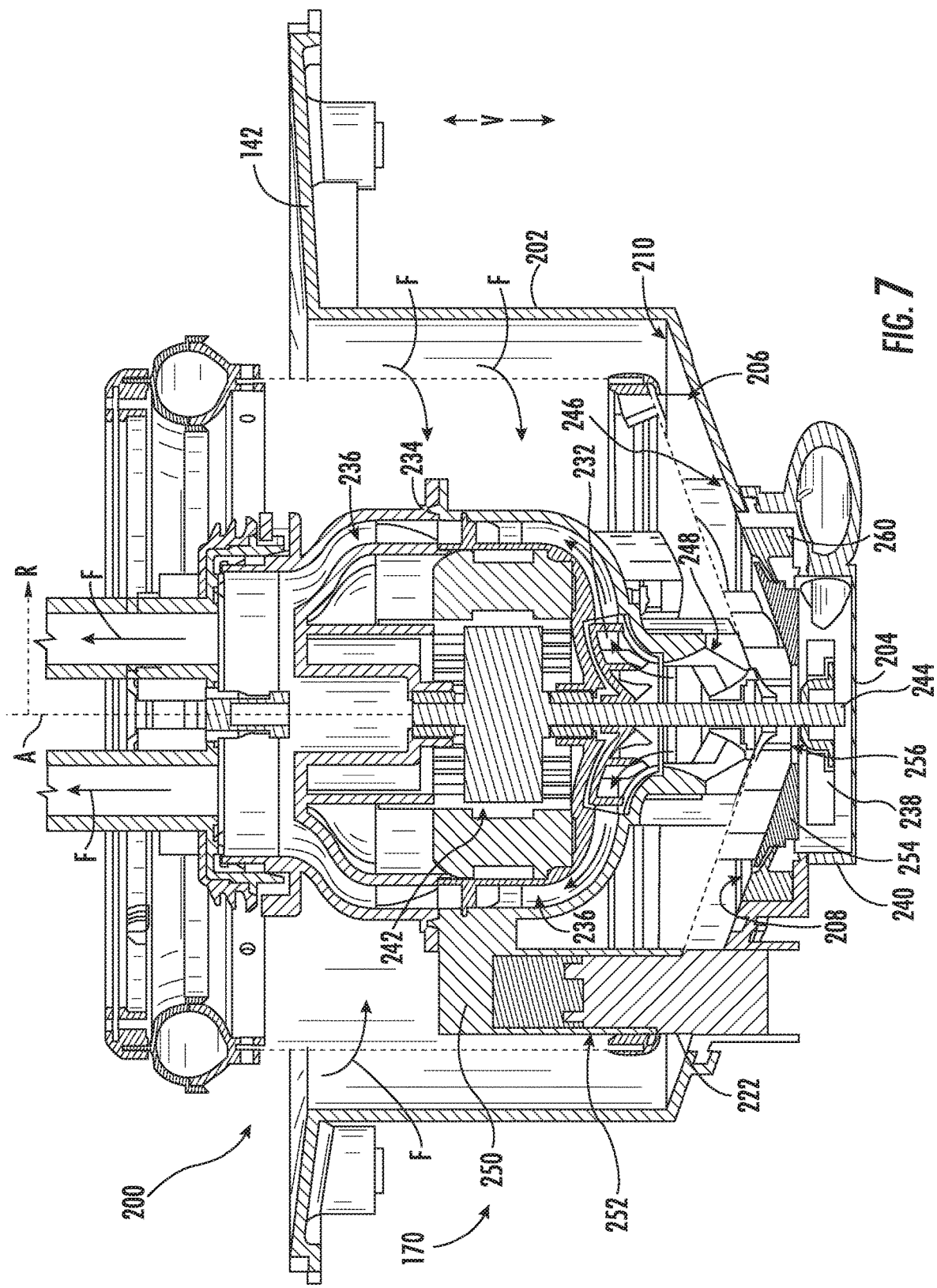
FIG. 7 provides a cross-sectional view of the exemplary sump of FIG. 3 during a circulation cycle.

Referring now particularly to FIG. 7, sump 170 is depicted during operation of circulation pump 154 (FIG. 2), such as during a circulation cycle (e.g., wash or rinse cycle) of the exemplary dishwashing appliance 100. During operation of circulation pump 154, a passage 246 may be defined between bottom panel 214 of the filter assembly and bottom wall 204 of sump 170. As shown, passage 246 may further extend between bottom panel 214 and volute cover 254. Passage 246 generally allows for wash fluid to access bottom panel 214 of the filter assembly. Accordingly, during operation of circulation pump 154, impeller 232 of circulation pump 154 may pull a flow of wash fluid F through the filter assembly (e.g., through the top panel, side panel 212, or bottom panel 214, such that wash fluid flows inwardly through the panels). From passage 246, fluid may flow into chamber pump housing 234 through inlet 248. Within chamber pump housing 234, fluid may flow through internal channels 236 and past or over diffuser vanes 270. The foil profile 272 of each diffuser vane 270 may serve to convert a velocity head of the fluid flow to a static head. From the internal channel 236, fluid may continue to flow downstream (e.g., to one or more of the spray assemblies 142, 148, 150).

During operation of circulation pump 154, soils in wash fluid may gravitate towards recessed chamber 206 defined in bottom wall 204 of sump 170. For example, an inlet 248 of circulation pump 154 is positioned adjacent bottom panel 214 of the filter assembly, and thus wash fluid may first be pulled through bottom panel 214 of the filter assembly. Additionally or alternatively, as recessed chamber 206 is positioned at a bottom of sump 170, gravitational forces may also cause soils to gravitate towards recessed chamber 206. Such a configuration may allow for efficient draining and cleaning of sump 170, as the drain opening 208 opens into recessed chamber 206 defined by bottom wall 204. As shown, bottom wall 204 may include or be provided as a solid continuous surface. Thus, at least a portion of the bottom wall 204 (e.g., a lowermost surface thereof, which is directly beneath recessed chamber 206 and impeller 238) may be free of an openings or apertures (e.g., vertical openings) through which water may pass.

Figure 8:
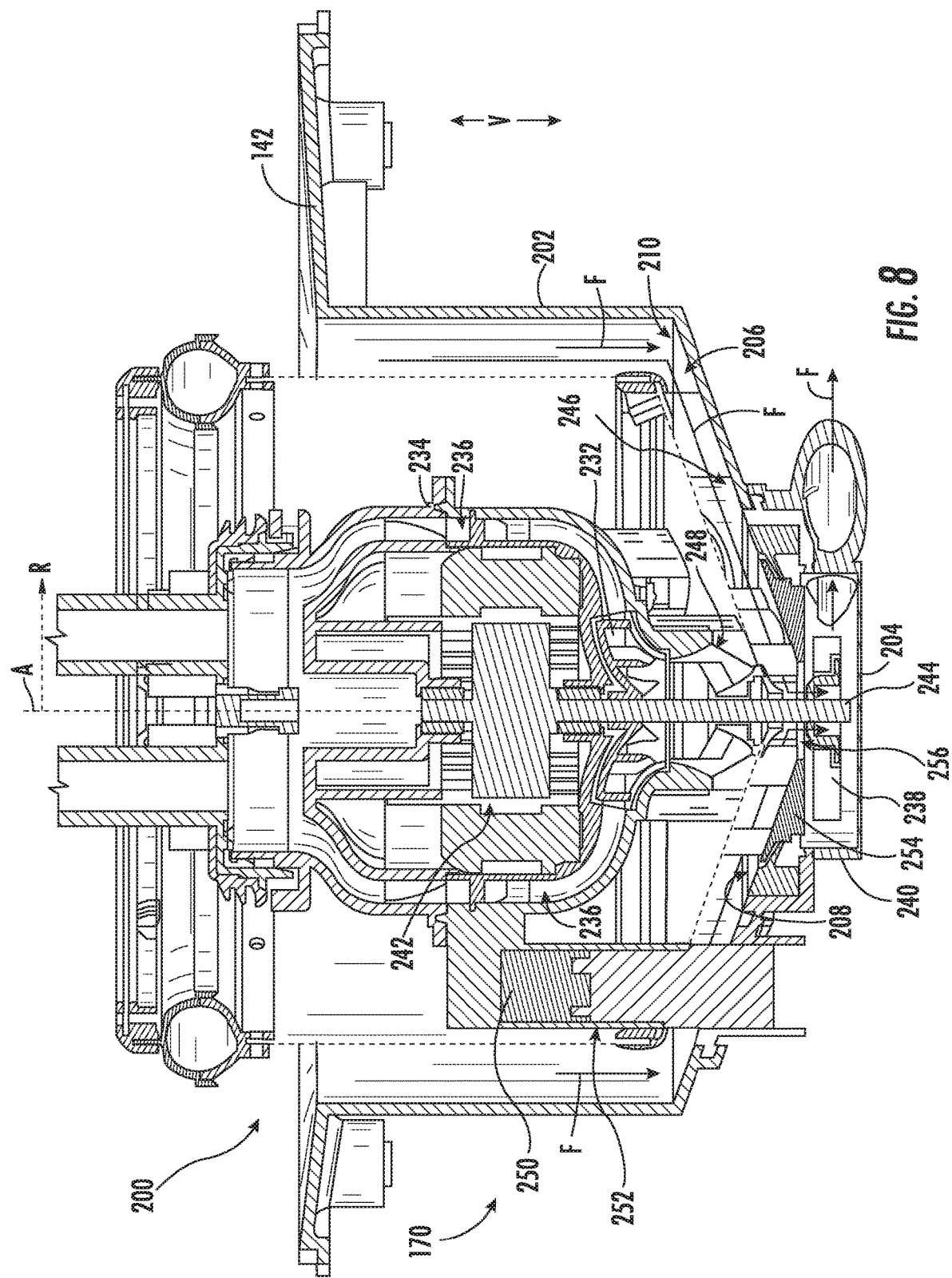
FIG. 8 provides a cross-sectional view of the exemplary sump of FIG. 3 during a drain cycle.
Figure 9:
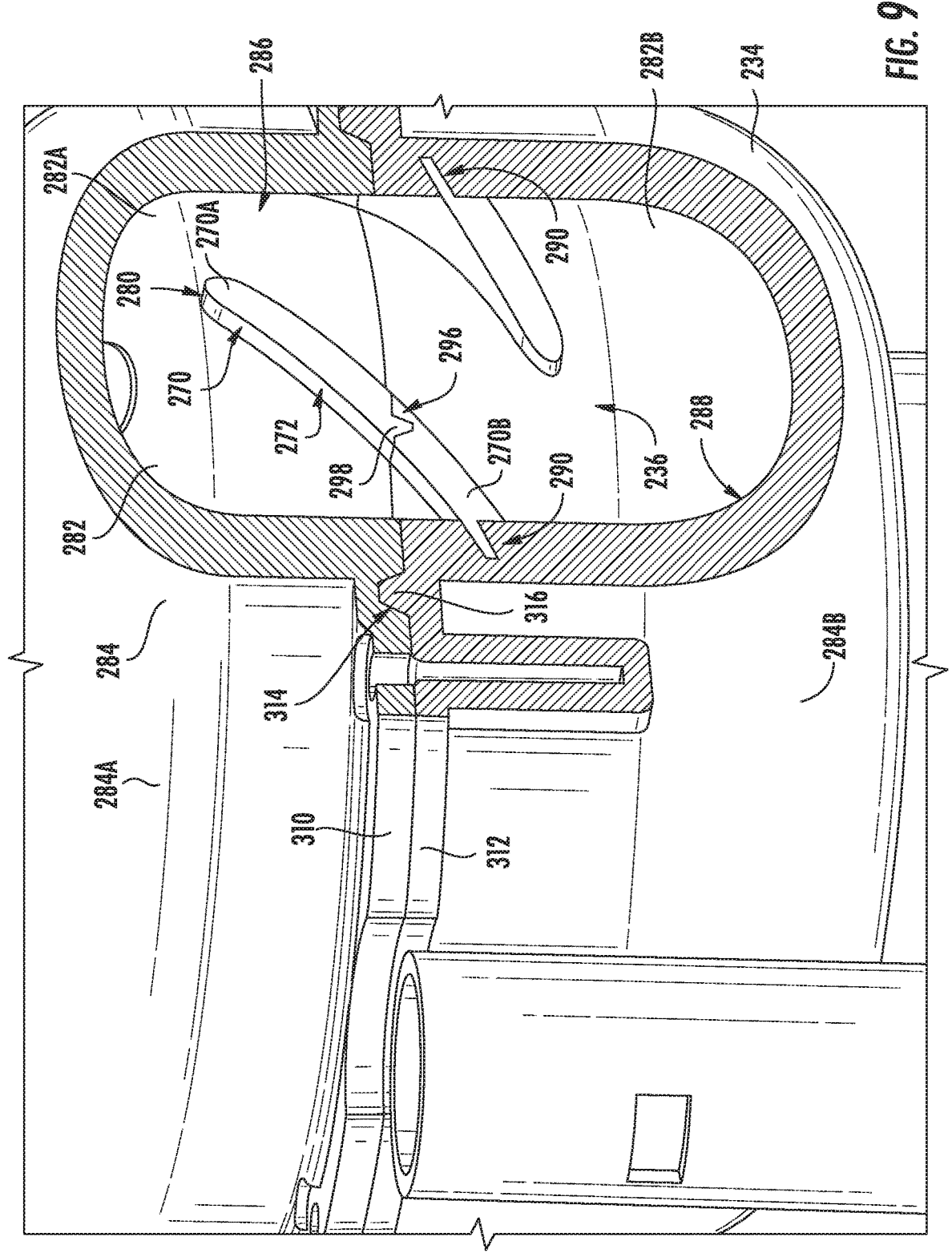
FIG. 9 provides a cross-sectional view of a portion of the exemplary pump assembly of FIG. 4.
Figure 10:
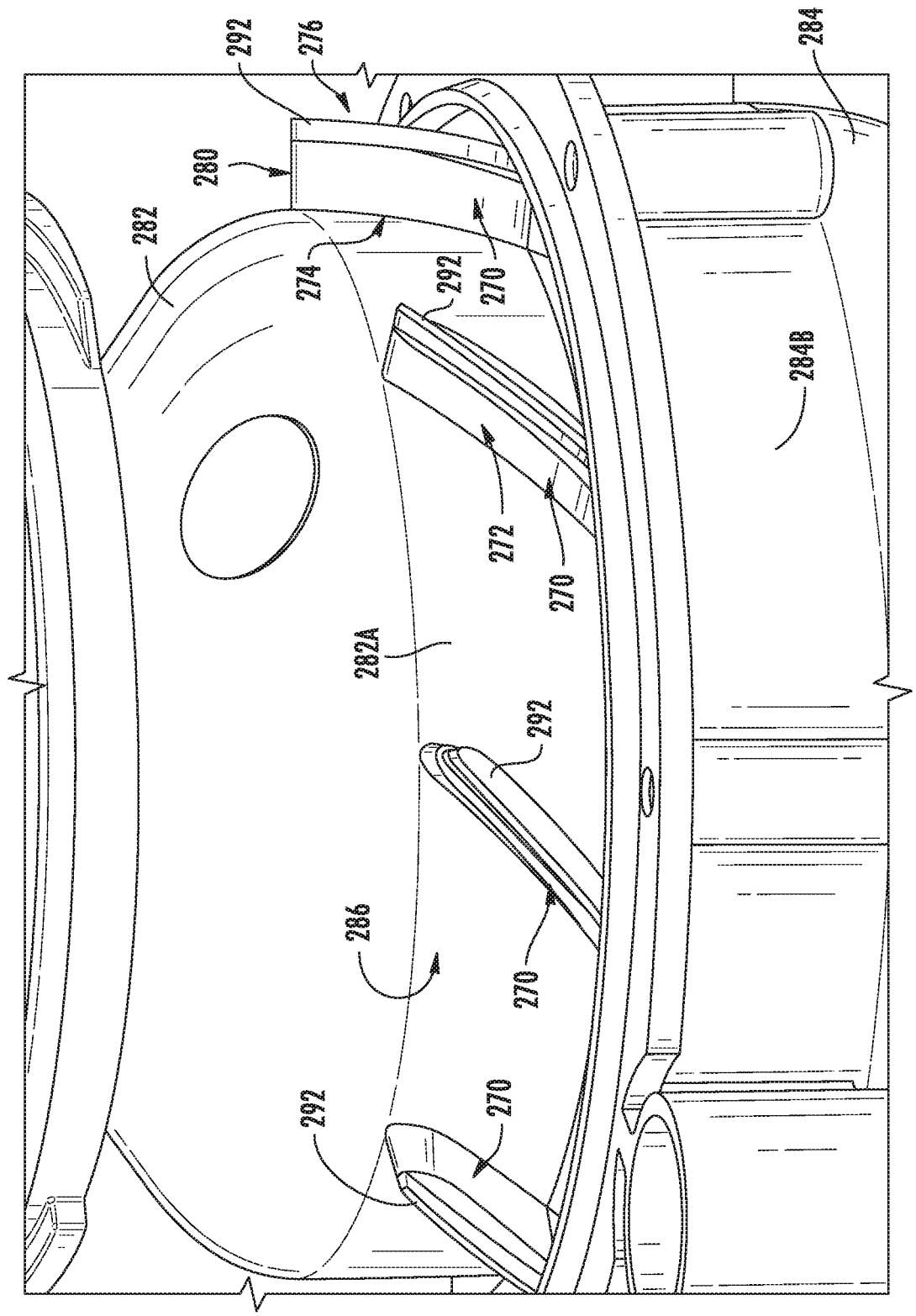
FIG. 10 provides a cross-sectional view of a portion of the exemplary pump assembly of FIG. 4, wherein a portion has been removed for clarity.
Figure 11:
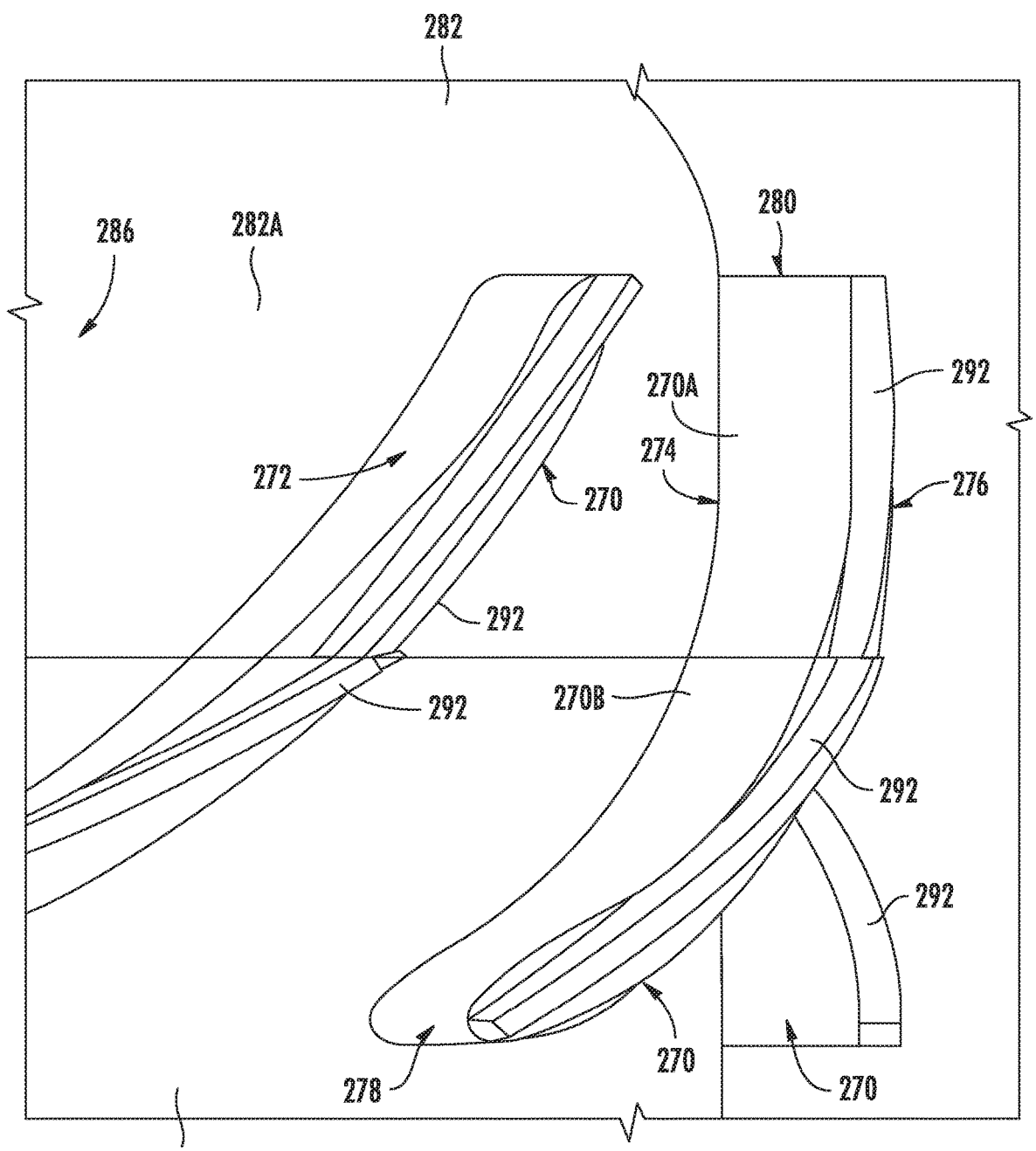
FIG. 11 provides a magnified perspective view of a plurality of vanes of the exemplary pump assembly of FIG. 4.
Figure 12:
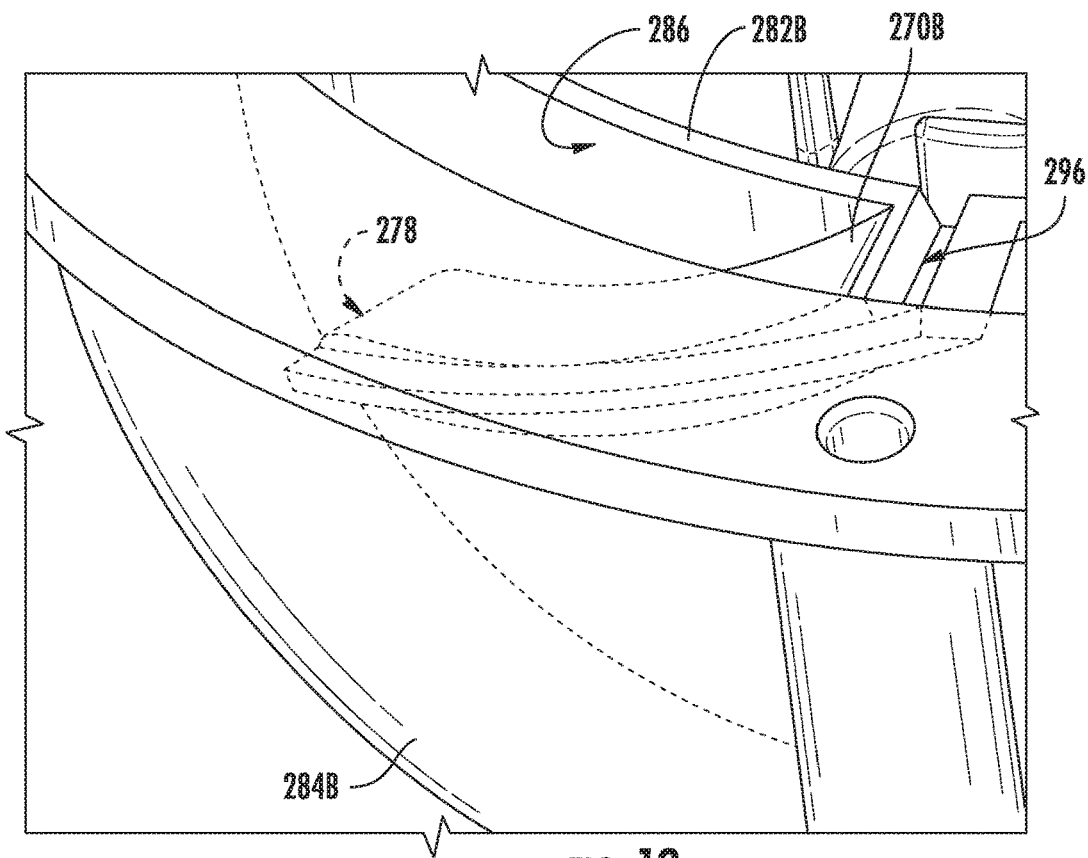
FIG. 12 provides a perspective view of a lower portion of the exemplary pump assembly of FIG. 4.

Referring now particularly to FIG. 8, sump 170 is depicted during operation of drain pump 156 (FIG. 2), such as during a drain cycle of the exemplary dishwashing appliance 100. During operation of drain pump 156, a flow of wash fluid F may be pulled from sump 170 through recessed chamber 206 in bottom wall 204 of sump 170 and through drain pump opening 208 of bottom wall 204. As many of the soils may be positioned in recessed chamber 206, drain pump 156 may expel the soils previously gathered in recessed chamber 206 of bottom wall 204 more quickly and may leave less soils behind for subsequent cycles.

Turning now especially to FIGS. 3, 4, and 9 through 15, in some embodiments, one or more diffuser vanes 270 are provided within chamber pump housing 234. Specifically, diffuser vanes 270 may be positioned within (e.g., to at least partially define) internal channels 236.

As shown, each vane 270 generally extends (e.g., along the radial direction R) from an inner radial end 274 to an outer radial end 276. Moreover, each diffuser vane 270 may define a foil profile 272. In turn, the outer surface of each diffuser vane 270 is generally curved or nonlinear between a first axial end 278 and a second axial end 280. The foil profile 272 may have a varied vane width or thickness (e.g., such that thickness of the foil profile 272 tapers between the two axial ends 278, 280) and generally serves to form a high-pressure side and a low pressure side. During use (e.g., during a circulation operation), fluid flow within chamber housing 234 may be directed within internal channels 236 according to a curved or relatively helical path about the axial direction A.

In certain embodiments, a discrete inner diffuser bowl 282 and outer diffuser bowl 284 are included with chamber pump housing 234. As shown, inner diffuser bowl 282 is enclosed, at least in part, within outer diffuser bowl 284. When assembled, at least a portion of inner diffuser bowl 282 and outer diffuser bowl 284 may be spaced apart (e.g., along the radial direction R) to define, for example, the radial bounds of internal channels 236. For instance, internal channels 236 may be defined between an outer wall surface 286 of inner diffuser bowl 282 and an inner wall surface 288 of outer diffuser bowl 284. As shown, outer diffuser bowl 284 may define inlet 248 (e.g., below inner diffuser bowl 282) and a downstream outlet 249 (e.g., above inner diffuser bowl 282 and in fluid communication with one or more of the spray assemblies 142, 148, 150). Thus, internal channels 236 may extend across inner diffuser bowl 282 within outer diffuser bowl 284. Additionally or alternatively, impeller 232 may be housed within outer diffuser bowl 284 while remaining outside of inner diffuser bowl 282. Optionally, motor 242 may located radially inward from the diffuser vanes 270. For instance, motor 242 may be enclosed within inner diffuser bowl 282 and sealed from fluid communication with internal channels 236. As shown, axial shaft 244 may extend from inner diffuser bowl 282 and out through outer diffuser bowl 284 (e.g., to simultaneously mechanically couple with impellers 232 and 238).

In some embodiments, each vane 270 is fixed to inner diffuser bowl 282 or outer diffuser bowl 284 while being selectively attached to the other bowl 284 or 282. For instance, the inner radial end 274 of one or more vanes 270 may be formed on outer wall surface 286 of inner diffuser bowl 282 (e.g., as an integral monolithic or unitary structure). Outer radial end 276 of vane 270 may then be attached to outer diffuser bowl 284 (e.g., by a threaded engagement joint 290).

In the exemplary embodiments illustrated in FIGS. 3, 4, and 9 through 15, threaded engagement joint 290 selectively attaches the outer radial end 276 of vane 270 to inner wall surface 288 of outer diffuser bowl 284. When assembled, threaded engagement joint 290 is thus formed between vane 270 and inner wall surface 288. As shown, threaded engagement joint 290 includes a pair of complementary radial thread profiles 292, 294. A first radial thread profile 292 extends (e.g., radially outward or radially inward) from the corresponding vane 270 at the outer radial end 276, while a second radial thread profile 294 is formed on inner wall surface 288. For example, first radial thread profile 292 may be male extrusion selectively received within the female groove of second radial thread profile 294. Threaded engagement joint 290 may generally function as a screw, thus rotation of outer diffuser bowl 284 or inner diffuser bowl 282 about the axial direction A relative to the other bowl 282 or 284 may serve to interlock the radial thread profiles 292, 294 and attach the diffuser bowls 282, 284.

Figure 13:
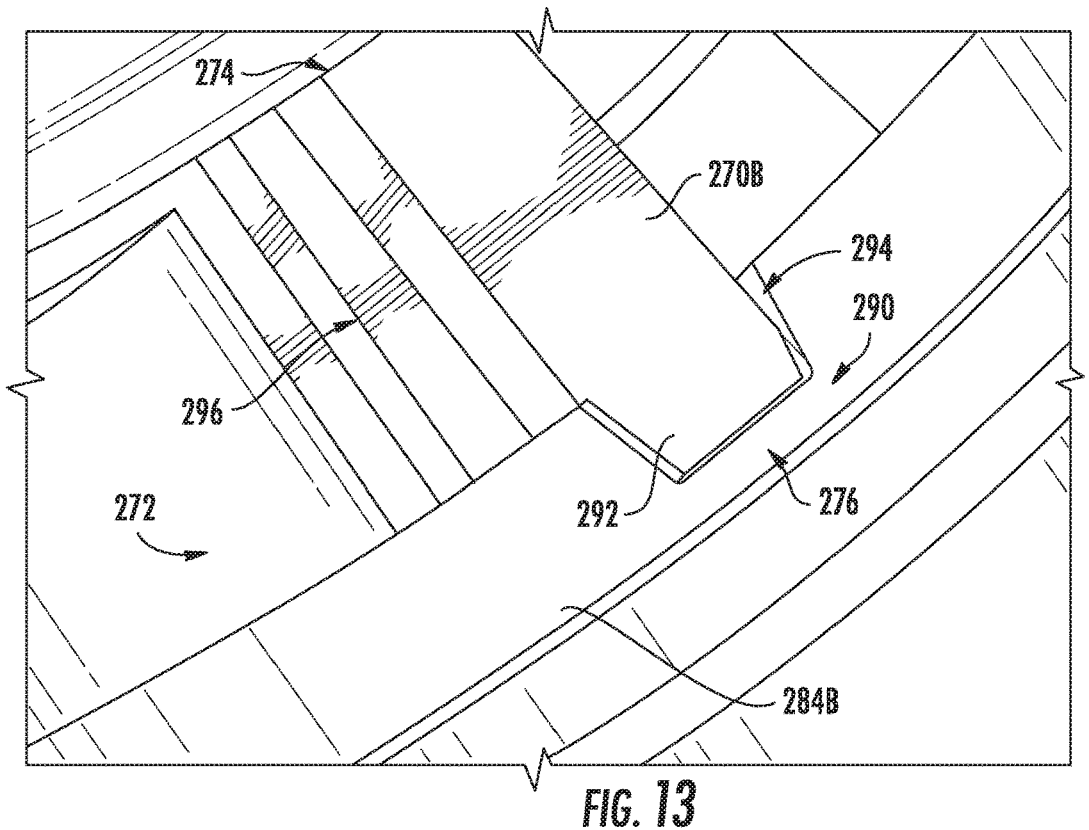
FIG. 13 provides a top perspective view of a lower portion of a vane of the exemplary pump assembly of FIG. 4.
Figure 14:
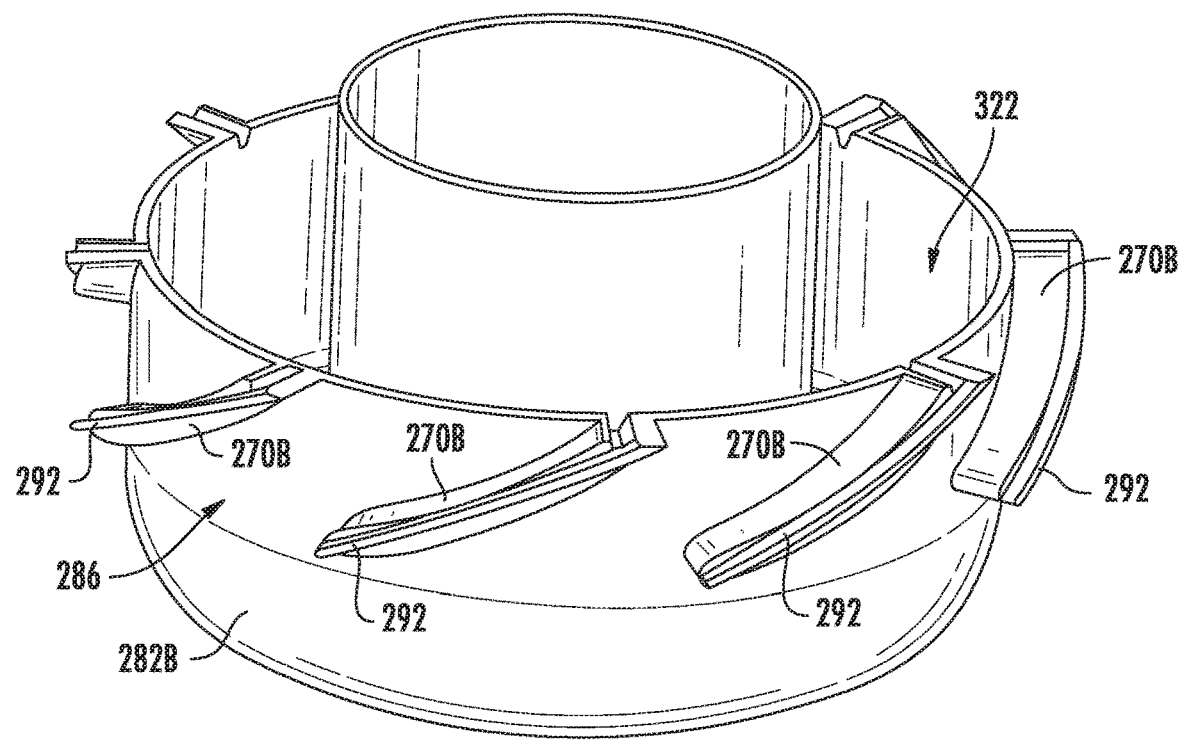
FIG. 14 provides a perspective view of a lower inner portion of the exemplary pump assembly of FIG. 4.
Figure 15:
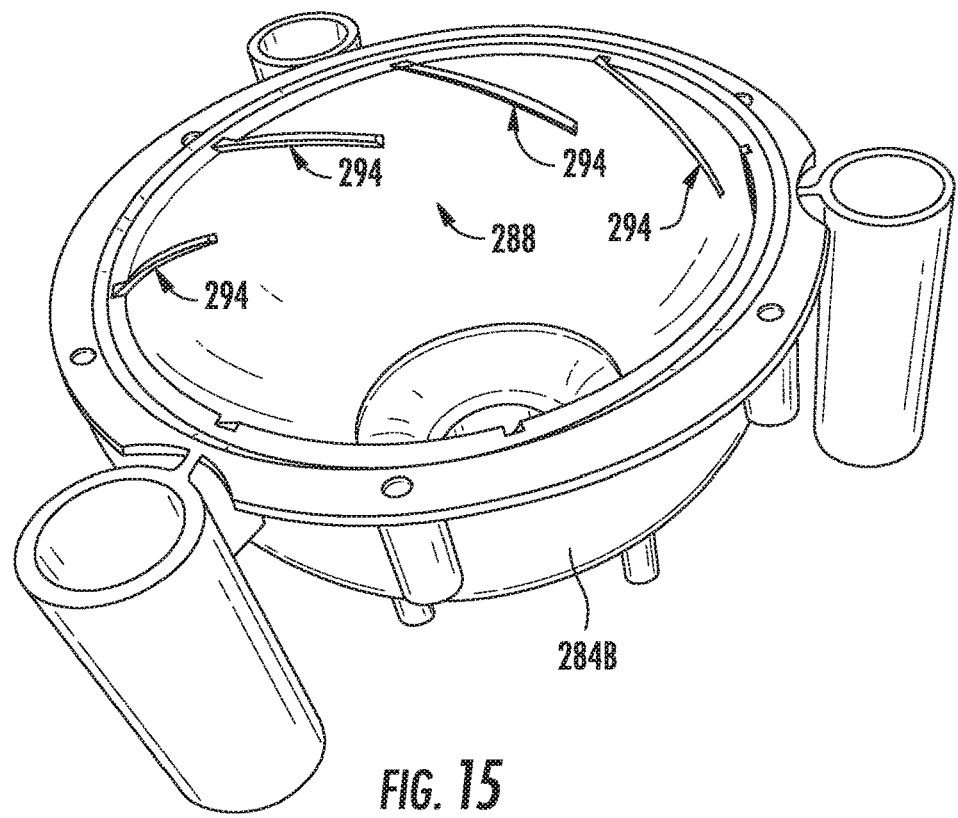
FIG. 15 provides a perspective view of a lower outer portion of the exemplary pump assembly of FIG. 4.

Any suitable thread shape may be provided. For instance, when viewed along the cross-section perpendicular to the axial direction A, threaded engagement joint 290 may define an angled, blunt-nose thread shape (e.g., as illustrated in FIG. 13). Alternatively, threaded engagement joint 290 may have a rounded thread shape (e.g., similar to a knuckle thread), a triangular thread shape (e.g., similar to a buttress thread), a square thread shape (e.g., similar to a square thread), etc.

It is noted that while the first radial thread profile 292 is illustrated as a male extrusion extending radially outward from the foil profile 272 of vane 270, and the second radial thread profile 294 is illustrated as a female groove extending within outer diffuser bowl 284, it is understood that this relationship may be reversed. In other words, the first radial thread profile 292 may be provided as female groove extending radially inward from a foil profile 272 and within the corresponding vane 270, while the second thread profile is provided as a male extrusion extending radially inward from inner wall surface 288 of outer diffuser bowl 284.

Although both of the foil profile 272 and the first radial thread profile 292 provided on or defined by a common vane 270, each profile 272 or 292 may be unique from the other 292 or 272. Specifically, the first radial thread profile 292 is defined along a set or constant helical path. The first radial thread profile 292 thus has a curve and thread pitch that does not change (e.g., along the axial direction A). Optionally, the thread thickness or diameter (e.g., in the axial direction A or radial direction R) may be constant. In contrast to the first radial thread profile 292, the foil profile 272 may be defined along a varied or non-constant, curved path. The curve or angle of the foil profile 272 may thus change (e.g., along the axial direction A). Thus, the angle or shape of the foil profile 272 may be different at the second axial end 280 than the angle or shape of the foil profile 272 at the first axial end 278 (or at another portion of the foil profile 272 between the first axial end 278 and the second axial end 280).

In some embodiments, the first radial thread profile 292 is bounded within a radial cross-section of the foil profile 272. Thus, when viewed along the radial direction R (e.g., such that a plane perpendicular to the radial direction R is visible), the first radial thread profile 292 may appear to be wholly enclosed within the foil profile 272. In other words, the first radial thread profile 292 may be formed such that the non-radial extrema (i.e., extrema perpendicular to the radial direction R, such as the axial direction A) of the first radial thread profile 292 do not extend beyond the non-radial extrema defined by the corresponding foil profile 272 (e.g., at the outer radial end 276).

Advantageously, the threaded engagement joint 190 may establish a seal between vane 270 and inner wall surface 288 or otherwise prevent crossover leakage (e.g., between the high pressure and low pressure sides of vane 270).

In certain embodiments, one or more portions of chamber pump housing 234 are provided as discrete and separable upper and lower housing sections. As an example, inner diffuser bowl 282 may include an inner upper section 282A that is selectively supported on an inner lower section 282B. As an additional or alternative example, outer diffuser bowl 284 may include an outer upper section 284A that is selectively supported on an outer lower section 284B. Thus, one or both of the diffuser bowls 282, 284 may be selectively separated or attached (e.g., while advantageously providing a fluid seal at the attachment points thereof).

In certain embodiments wherein inner diffuser bowl 282 includes an inner upper section 282A and an inner lower section 282B, one or more of the vanes 270 includes multiple discrete and separable segments. For instance, vane 270 may include a lower segment 270B fixed to the inner lower section 282B and an upper segment 270A fixed to the inner upper section 282A. Each of lower segment 270B and upper segment 270A may define separate portions of the foil profile 272. When the lower segment 270B and the upper segment 270A are attached together (e.g., in contact with each other) the foil profile 272 may be continuous across the entire vane 270. In some such embodiments, a complementary groove—notch joint is formed between the lower and upper segments 270B, 270A. For instance, the lower segment 270B may define an axial groove 296 (e.g., extending between inner radial end 274 and outer radial end 276) at a top surface of the lower segment 270B. Similarly, the upper segment 270A may define an axial notch 298 at a bottom surface of the upper segment 270A. When assembled, the axial notch 298 may be mated with and received within the axial groove 296 such that relative rotation between the segments 270A, 270B (e.g., about the axial direction A) is prevented or restricted.

In additional or alternative embodiments wherein outer diffuser bowl 284 includes an outer upper section 284A and an outer lower section 284B, one or more the vanes 270 includes multiple threaded engagement joints 290. For instance, a separate or unique threaded engagement joint 290, each including a complementary first and second radial thread profiles 292, 294, may be included with the upper and lower segments 270A, 270B of the vane 270. Thus, a lower threaded engagement joint 290 may be formed between the outer lower section 284B and the lower segment 270B of the vane 270. Moreover, an upper threaded engagement joint 290 may be formed between the outer upper section 284A and the upper segment 270A of the vane 270. In some such embodiments, the first radial thread profile 292 of both the lower segment 270B and the upper segment 270A are bounded within the radial cross-section of the foil profile 272 (e.g., within the portion of the foil profile 272 defined by the corresponding segment 270A, 270B).

Optionally, lower and upper threaded engagement joints 290 may be defined along identical paths (e.g., such that radial thread profiles 292, 294 are defined according to the same thread pitch or size). Alternatively, and as illustrated, lower and upper threaded engagement joints 290 may each be unique. As an example, each threaded engagement joint 290 may define a different thread pitch (e.g., axial distance between one crest of a thread and another axially adjacent crest—if the predetermined path were followed such that multiple crests were provided). In other words, the first and second radial thread profiles 292, 294 of the first engagement joint 290 may define a first thread pitch, and the first and second radial thread profile 292, 294 of the second engagement joint 290 may define a second thread pitch that is not equal the first thread pitch. For instance, the second thread pitch may be greater than the first thread pitch.

In further additional or alternative embodiments wherein outer diffuser bowl 284 includes an outer upper section 284A and an outer lower section 284B, a pair of complementary lips 310, 312 may be included on the outer upper section 284A and the outer lower section 284B. A lower radial lip 312 may extend outward from outer lower section 284B (e.g., opposite inner wall surface 288), while an upper radial lip 310 extends outward from outer upper section 284A. In some such embodiments, a complementary groove—notch joint is formed between the lower and upper segments 270B, 270A. For instance, the upper radial lip 310 may define an axial groove 314 (e.g., extending along a circumferential direction about the axial direction A) at a bottom surface of the upper radial lip 310. Similarly, the lower radial lip 312 may define an axial notch 316 at a top surface of the lower radial lip 312. When assembled, the axial notch 316 may be mated with and received within the axial groove 314 such that relative radial movement between the sections is prevented or restricted. Moreover, the complementary groove—notch joint may seal outer diffuser bowl 284 and prevent fluid from passing between the radial lips 310, 312.

Turning especially to FIGS. 16 and 17, as noted above, electric motor 242 may include a multi-phase winding set 320 (e.g., sealed within inner diffuser bowl 282). Thus, electric motor 242 may be provided as a multi-phase motor, such as a 3-phase motor. Multi-phase winding set 320 may thus include a plurality of phase windings, such as a first phase winding 330, a second phase winding 332, and a third phase winding 334. As shown, each of the windings 330, 332, 334, may include a discrete pair of wound bobbins. Specifically a first wound bobbin 340A and a second wound bobbin 340B of each winding 330, 332, or 334 are provided. When assembled, the first and second wound bobbins 340A, 340B may be circumferentially spaced apart from each other (e.g., at opposite radial ends). Additionally or alternatively, each phase winding 330, 332, 334 may be circumferentially spaced apart from each other such that none of the bobbins 340A, 340B are in direct contact. Nonetheless, each phase winding 330, 332, 334 may be electrically connected to each other in electrical series.

When assembled, multi-phase winding set 320 includes a first terminal 342 and a second terminal 344 joined at opposite ends to power line 326 (e.g., the singular, sole power line 326). Each phase winding may be electrically connected between first terminal 342 and second terminal 344. Specifically, each phase winding (e.g., windings 330, 332, 334) is connected in series with each other. A connecting wire may thus extend between adjacent windings or wound bobbins, as would be understood.

In certain embodiments, one or more thermal cutouts (TCOs) (e.g., 350, 352, 354) are mounted within chamber pump housing 234 (e.g., within inner diffuser bowl 282) and further sealed within overmolded insulation 324. For instance, prior to sealing multi-phase winding set 320 within overmolded insulation 324, the TCO(s) may be electrically connected between first terminal 342 and second terminal 344. One or more TCOs may, in turn, be connected in electrical series with the multi-phase winding set 320. In optional embodiments, a distinct TCO 350, 352, or 354 corresponds to a discrete phase winding 330, 332, or 334. For instance, a first TCO 350 may correspond to first phase winding 330, a second TCO 352 may correspond to second phase winding 332, and a third TCO 354 may correspond to third phase winding 334.

Each TCO (e.g., TCOs 350, 352, 354) may be electrically connected in series with its corresponding phase winding (e.g., windings 330, 332, 334). Specifically, each TCO may form the electrical path between adjacent phase windings. As is understood, each TCO may be configured to selectively open the electrical path therethrough in response to detecting a setpoint temperature. Thus, in response to a TCO detecting a temperature within chamber pump housing 234 that is equal to or above the setpoint temperature, the TCO may open, breaking the electrical circuit through multi-phase winding set 320 (e.g., at the corresponding phase winding) and preventing operation of electric motor 242.

The setpoint temperature may generally be set according to the acceptable or desired maximum operating temperature of electric motor 242. In some embodiments, the setpoint temperature of one or more TCO (e.g., TCO 350, 352, 354) may be greater than or equal to 100° Celsius (e.g., between 100° Celsius and 120° Celsius). For instance, the setpoint temperature may be 110° Celsius. Optionally, each TCO may have a common setpoint temperature.

As noted above, the TCOs (e.g., TCOs 350, 352, 354) may be sealed within the overmolded insulation 324. Generally, the TCOs are positioned in close proximity or contact with one or more portions of multi-phase winding set 320. In some embodiments, TCOs are mounted on one or more bobbins (e.g., on the portion of wire wound about the corresponding bobbin) to advantageously detect a temperature at a corresponding bobbin. As an example, first TCO 350 may be mounted on the first wound bobbin 340A of first phase winding 330. As an additional or alternative example, second TCO 352 may be mounted on the first wound bobbin 340A of second phase winding 332. As another additional or alternative example, third TCO 354 may be mounted on the first wound bobbin 340A of third phase winding 334.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fluid pump configured for a dishwashing appliance to motivate a fluid therethrough, the fluid pump comprising:
   a fluid impeller rotatably receivable within a tub of the dishwashing appliance;
   an electric motor in mechanical communication with the fluid impeller to motivate rotation thereof, the electric motor comprising a multi-phase winding set sealed within an overmolded insulation; and a housing enclosing the electric motor therein, the housing being receivable within a sump to which water is directed in the dishwashing appliance;

wherein the electric motor further comprises a plurality of thermal cutouts (TCOs) mounted within the housing and sealed within the overmolded insulation.

2. The fluid pump of claim 1, wherein the plurality of TCOs are connected in electrical series with the multi-phase winding set.

3. The fluid pump of claim 1, wherein the multi-phase winding set comprises a plurality of phase windings, and wherein each TCO of the plurality of TCOs corresponds to a discrete phase winding of the plurality of phase windings.

4. The fluid pump of claim 1, wherein the multi-phase winding set comprises a first phase winding, a second phase winding, and a third phase winding.

5. The fluid pump of claim 4, wherein the first phase winding, the second phase winding, and the third phase winding each comprise a discrete pair of wound bobbins having a first wound bobbin and a second wound bobbin circumferentially spaced apart from the first wound bobbin.

6. The fluid pump of claim 5, wherein the plurality of TCOs of the electric motor further comprise
a first thermal cutout (TCO) mounted on the first wound bobbin of the first phase winding,
a second TCO mounted on the first wound bobbin of the second phase winding, and
a third TCO mounted on the first wound bobbin of the third phase winding.

7. The fluid pump of claim 1, wherein the fluid pump further comprises a singular, sole power line extending through the housing to the electric motor therein.

8. The fluid pump of claim 1, further comprising a plurality of elastomer columns extending vertically, wherein the housing is held on the plurality of elastomer columns.

9. The fluid pump of claim 8, further comprising a power line extending through at least one elastomer column of the plurality of elastomer columns, wherein an electrical connection is formed with the electric motor through the power line.

10. A dishwashing appliance defining a vertical direction, the dishwashing appliance comprising:
a tub defining a wash chamber;
a sump positioned at a bottom portion of the tub along the vertical direction, the sump comprising a bottom wall defining a recessed chamber; and
a fluid pump in fluid communication with the sump to motivate a fluid therefrom, the fluid pump comprising
a fluid impeller rotatably positioned within the tub,
an electric motor in mechanical communication with the fluid impeller to motivate rotation thereof, the electric motor comprising a multi-phase winding set sealed within an overmolded insulation, and
a housing enclosing the electric motor therein;
wherein the electric motor further comprises a plurality of thermal cutouts (TCOs) mounted within the housing and sealed within the overmolded insulation.

11. The fluid pump of claim 10, wherein the plurality of TCOs are connected in electrical series with the multi-phase winding set.

12. The fluid pump of claim 10, wherein the multi-phase winding set comprises a plurality of phase windings, and wherein each TCO of the plurality of TCOs corresponds to a discrete phase winding of the plurality of phase windings.

13. The dishwashing appliance of claim 10, wherein the multi-phase winding set comprises a first phase winding, a second phase winding, and a third phase winding.

14. The dishwashing appliance of claim 13, wherein the first phase winding, the second phase winding, and the third phase winding each comprise a discrete pair of wound bobbins having a first wound bobbin and a second wound bobbin circumferentially spaced apart from the first wound bobbin.

15. The fluid pump of claim 14, wherein the plurality of TCOs of the electric motor further comprise
a first thermal cutout (TCO) mounted on the first wound bobbin of the first phase winding,
a second TCO mounted on the first wound bobbin of the second phase winding, and
a third TCO mounted on the first wound bobbin of the third phase winding.

16. The dishwashing appliance of claim 10, wherein the fluid pump further comprises a singular, sole power line extending through the housing to the electric motor therein.

17. The dishwashing appliance of claim 10, further comprising a plurality of elastomer columns extending vertically, wherein the housing is held on the plurality of elastomer columns.

18. The dishwashing appliance of claim 17, further comprising a power line extending through at least one elastomer column of the plurality of elastomer columns, wherein an electrical connection is formed with the electric motor through the power line.

\* \* \* \* \*